United States Patent [19]
Manigault

[11] 3,804,649
[45] Apr. 16, 1974

[54] ZIRCON REFRACTORY COMPOSITIONS
[75] Inventor: Edward L. Manigault, Cincinnati, Ohio
[73] Assignee: The Chas. Taylor's Sons Company, Cincinnati, Ohio
[22] Filed: Dec. 20, 1972
[21] Appl. No.: 316,700

[52] U.S. Cl.................................. 106/57, 166/66
[51] Int. Cl....................... C04b 35/12, C04b 35/16
[58] Field of Search.......................... 106/57, 65, 66

[56] References Cited
UNITED STATES PATENTS
3,181,958  5/1965  Thomas .............................. 106/57

Primary Examiner—James E. Poer
Attorney, Agent, or Firm—Robert L. Lehman

[57] ABSTRACT

A new refractory composition from 85.0 percent to 98.8 percent zircon, from 1.0 percent to 8.0 percent chromic oxide and from 0.2 percent to 5.0 percent titanium dioxide has been prepared which has a low porosity, a high modulus of rupture and has a high resistance to corrosion by molten metals.

2 Claims, No Drawings

ZIRCON REFRACTORY COMPOSITIONS

BACKGROUND OF THE INVENTION

Many types of ceramic compositions have been prepared in the past which have given good service in glass contact and back-up linings for the glass industry. One particular type of ceramic composition which is particularly useful is the so-called "zircon" brick which may consist of from 96% to 99% zirconium silicate, and from 1% to 4% other oxides. Although these zircon bricks are commercially useful, it has been found that the composition may be modified to produce a superior type of brick which has an increased modulus of rupture, an increased bulk density and a decreased porosity. In addition, the brick is more resistant to penetration by metal and metallic oxide often present when "tramp" metal is unintentionally introduced in the glass batch with recycled glass. This new refractory is particularly useful as a back-up, or sub-floor, under the glass contact bottom blocks in a glass-melting tank.

SUMMARY OF THE INVENTION

A new ceramic composition has been produced comprising from 85.0% to 98.8% zircon, from 1.0% to 8.0% chromic oxide and from 0.2% to 5.0% titanium dioxide, all of the percentages expressed on a weight basis. Such a composition when fired between 1,450°C and 1,600°C produced bricks and other shapes which have superior properties to those obtained from the well-known "zircon" bricks.

DESCRIPTION OF THE PREFERRED EMBODIMENTS

It has been found that when small amounts up to 8.0% chromic oxide are added as a modifying agent, that superior results are obtained over zircon bricks containing no chromic oxides.

In preparing the new refractory composition of the instant invention, the zircon (zirconium silicate) is sized to −70 mesh. The chromic oxide and the titanium dioxide are ground to −325 mesh size.

The three ingredients are thoroughly mixed with water and lignin liquor to temper the mixture and the mixture is then pressed into shapes and fired at a temperature between 1,450°C and 1,600°C.

When the instant refractory product is compared with the "zircon" prior art products, it has been found that the general physical properties of the instant product are improved. The bulk density and the modulus of rupture are both increased while the porosity is decreased. The instant refractory product is also more resistant to iron oxide penetration than the prior art product.

In order to describe more fully the instant invention, the following examples are presented:

EXAMPLE 1

93.5 kg of zircon (−70 mesh) were mixed with 6 kg of chromic oxide and 0.5 kg of rutile titanium dioxide. Both the chromic oxide and the rutile were −325 mesh size.

3 kg of an organic binder and 1.1 kg of water were mixed with the above ingredients to temper the mixture. The mixture was then formed into bricks 9 inches × 4½ inches × 3 inches and were fired at 1,560°C for 5 hours.

The fired bricks had the following properties:

| | |
|---|---|
| Modulus of Rupture, psi | 3270 |
| Porosity, % | 15.5 |
| Absorption, % | 3.9 |
| Bulk Density, g/cc | 3.95 |

These properties are superior to a typical standard "zircon" brick which possesses the following properties:

| | |
|---|---|
| Modulus of Rupture, psi | 2300 |
| Porosity, % | 17.5 |
| Bulk Density, g/cc | 3.72 |

In order to show the bricks' resistance toward penetration of tramp metal into the brick, the following test was run:

A ¾ inch black steel nut was placed on the surface of the brick produced and the brick was heated to 1,565°C for 5 hours. After cooling the depth of penetration of the iron oxide into the brick was measured as 0.39 inch.

For comparison a prior art zircon brick was subjected to the same test and it was found that the depth of penetration was 2⅛ inches.

EXAMPLES 2–4

In these examples the procedure of Example 1 was repeated except that varying amounts of the ingredients were employed. The amounts of ingredients used and the results obtained are recorded in the table along with those of Example 1 and the prior art "zircon" bricks.

Examples 2 and 3 contained chromic oxide in amounts of 2.0 and 4.2% respectively while in Example 4 an amount of 10.0% was used which lies outside the range of chromic oxide addition.

From the table it has clearly been shown that the bricks formed using amounts of chromic oxides which fall within the range of the instant invention produce over-all superior results to those obtained by the prior art "zircon" bricks. The products possessed superior modulus of rupture, increased bulk density, decreased porosity and greater resistance toward iron penetration than the zircon bricks of the prior art. Example 4 which was an excessive amount of chromic oxide produced inferior modulus of rupture and porosity.

While this invention has been described and illustrated by the examples shown, it is not intended to be strictly limited thereto, and other variations and modifications may be employed within the scope of the following claims.

TABLE 1

| INGREDIENTS | EXAMPLE No. | | | | PRIOR-ART ZIRCON BRICK |
|---|---|---|---|---|---|
| | 1 | 2 | 3 | 4 | |
| Zircon, kg | 93.5 | 98 | 95.4 | 90 | 99 |
| Chromic Oxide, kg | 6 | 2.0 | 4.2 | 10 | — |
| Rutile, kg | 0.4 | 0.4 | 0.4 | 0.4 | 1.0 |

TABLE 1—Continued

| INGREDIENTS | 1 | 2 | EXAMPLE No. 3 | 4 | PRIOR-ART ZIRCON BRICK |
|---|---|---|---|---|---|
| PROPERTIES | | | | | |
| Modulus of Rupture, psi | 3270 | 3336 | 3514 | 2026 | 2300 |
| Porosity, % | 15.5 | 16.8 | 15.8 | 19.2 | 17.5 |
| Absorption, % | 3.9 | 4.3 | 4.1 | 5.0 | 3.72 |
| Bulk Density, g/cc | 3.95 | 3.87 | 3.87 | 3.80 | 2.12 |
| Nut test, Depth of penetration, inches | 0.39 | 0.78 | — | — | 2.13 |

I claim:

1. A refractory composition comprising from 85.0% to 98.8% zircon, from 1.0% to 8.0% chromic oxide and from 0.2% to 5.0% titanium dioxide, all percentages expressed by weight, said composition having a high modulus of rupture and low porosity, said refractory composition prepared from zircon particles −70 mesh in size and chromic oxide and titanium dioxide particles −325 mesh in size.

2. A method for preparing a refractory composition having a high modulus of rupture and low porosity which comprises thoroughly mixing zircon, chromic oxide and titanium dioxide, the amount of zircon employed being from 85.0% to 98.8%, the amount of chromic oxide being from 1.0% to 8.0% and the amount of titanium dioxide being from 0.2% to 5.0%, all percentages expressed by weight, said zircon being −70 mesh in size and said chromic oxide and said titanium dioxide being −325 mesh in size, forming the mixture into a ceramic shaped body, and firing the shaped body at a temperature from 1,450°C to 1,600°C to produce said refractory composition.

* * * * *